United States Patent
Reents et al.

(10) Patent No.: US 7,328,270 B1
(45) Date of Patent: Feb. 5, 2008

(54) COMMUNICATION PROTOCOL PROCESSOR HAVING MULTIPLE MICROPROCESSOR CORES CONNECTED IN SERIES AND DYNAMICALLY REPROGRAMMED DURING OPERATION VIA INSTRUCTIONS TRANSMITTED ALONG THE SAME DATA PATHS USED TO CONVEY COMMUNICATION DATA

(75) Inventors: Daniel B. Reents, Dripping Springs, TX (US); Donald G. Craycraft, Austin, TX (US); Carl K. Wakeland, Scotts Valley, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 553 days.

(21) Appl. No.: 09/257,521

(22) Filed: Feb. 25, 1999

(51) Int. Cl.
  *G06F 15/177* (2006.01)
  *G06F 15/16* (2006.01)
(52) U.S. Cl. ................... 709/230; 709/220; 709/221
(58) Field of Classification Search ............. 709/200, 709/250, 220–237; 370/1, 401, 402; 716/13, 716/14; 712/10–19, 221–225; 710/62, 65, 710/100, 105
See application file for complete search history.

(56) References Cited

U.S. PATENT DOCUMENTS

| | | | | |
|---|---|---|---|---|
| 4,979,095 A | * | 12/1990 | Ghaffari ................... | 359/114 |
| 4,991,133 A | * | 2/1991 | Davis et al. ............... | 709/217 |
| 5,257,393 A | * | 10/1993 | Miller ....................... | 709/224 |
| 5,303,344 A | * | 4/1994 | Yokoyama et al. ........ | 709/230 |
| 5,440,750 A | * | 8/1995 | Kitai et al. ................ | 709/230 |
| 5,528,587 A | * | 6/1996 | Galand et al. ............. | 370/412 |
| 5,590,328 A | * | 12/1996 | Seno et al. ................ | 370/466 |

(Continued)

OTHER PUBLICATIONS

U.S. Appl. No. 60/049,182.*

*Primary Examiner*—David Wiley
*Assistant Examiner*—David England
(74) *Attorney, Agent, or Firm*—Robert C. Kowert; Anthony M. Petro; Meyertons, Hood, Kivlin, Kowert & Goetzel, P.C.

(57) ABSTRACT

A communication protocol processor is presented including a transmit unit and a receive unit, each having multiple microprocessor cores connected in series. Each microprocessor core performs an operation upon a stream of communication data, conducted along a data path, according to instructions and associated data stored within a code memory unit. A change in the operation performed by a given microprocessor core is effectuated during communication protocol processor operation by transmitting new instructions and associated data to the microprocessor core along the data path. The new instructions and data modify the existing instructions and associated data stored within the code memory unit. The transmit unit of the communication protocol processor receives packet (i.e., transmit) data in parallel units and produces a framed serial transmit data stream. Each microprocessor core of the transmit unit is assigned one or more tasks which must be accomplished in sequence in order to encapsulate the transmit data stream into frames in accordance with a selected communication protocol. The receive unit receives a framed serial receive data stream and produces packet (i.e., receive) data in parallel units. Each microprocessor core of the receive unit is assigned one or more tasks which must be accomplished in sequence in order to extract receive data from the framed serial receive data stream in accordance with the selected communication protocol. The communication protocol processor may be included within a microcontroller, and the microcontroller employed within a network interface unit (NIU).

35 Claims, 9 Drawing Sheets

U.S. PATENT DOCUMENTS

| | | | |
|---|---|---|---|
| 5,598,410 A * | 1/1997 | Stone | 370/469 |
| 5,666,487 A * | 9/1997 | Goodman et al. | 370/395.64 |
| 5,699,532 A * | 12/1997 | Barrett et al. | 710/305 |
| 5,706,478 A * | 1/1998 | Dye | 345/503 |
| 5,724,356 A * | 3/1998 | Parameswaran Nair et al. | 370/401 |
| 5,802,287 A * | 9/1998 | Rostoker et al. | 370/230 |
| 5,850,388 A * | 12/1998 | Anderson et al. | 370/252 |
| 5,892,924 A * | 4/1999 | Lyon et al. | 709/245 |
| 5,905,873 A * | 5/1999 | Hartmann et al. | 709/249 |
| 5,943,481 A * | 8/1999 | Wakeland | 370/466 |
| 5,963,745 A * | 10/1999 | Collins et al. | 712/13 |
| 6,005,849 A * | 12/1999 | Roach et al. | 370/276 |
| 6,122,670 A * | 9/2000 | Bennett et al. | 709/236 |
| 6,151,131 A * | 11/2000 | Pepin et al. | 358/1.13 |
| 6,172,990 B1 * | 1/2001 | Deb et al. | 370/474 |
| 6,292,484 B1 * | 9/2001 | Oliver | 370/389 |
| 6,356,962 B1 * | 3/2002 | Kasper | 710/29 |
| 6,385,211 B1 * | 5/2002 | Williams et al. | 370/458 |
| 6,397,287 B1 * | 5/2002 | Brown et al. | 710/305 |
| 6,438,678 B1 * | 8/2002 | Cashman et al. | 712/34 |
| 6,442,669 B2 * | 8/2002 | Wright et al. | 712/19 |
| 6,483,543 B1 * | 11/2002 | Zhang et al. | 348/390.1 |

* cited by examiner

| Opening Flag Field | Address Field | Control Field | Information Field | Frame Check Sequencing Field | Closing Flag Field |
|---|---|---|---|---|---|
| 01111110 | 8 bits | 8 bits | 8*n bits | 16/32 bits | 01111110 |

COMMUNICATION PROTOCOL PROCESSOR HAVING MULTIPLE MICROPROCESSOR CORES CONNECTED IN SERIES AND DYNAMICALLY REPROGRAMMED DURING OPERATION VIA INSTRUCTIONS TRANSMITTED ALONG THE SAME DATA PATHS USED TO CONVEY COMMUNICATION DATA

BACKGROUND OF THE INVENTION

1. Field of the Invention

This invention relates to communication networks, and more particularly to microcontrollers employed within network interface units of devices coupled to computer communication networks.

2. Description of the Relevant Art

A computer network is a communication network interconnecting two or more computer systems for the purpose of exchanging data or sharing resources such as input/output (I/O) devices. There are two basic types of computer networks: local area networks (LANs) and wide area networks (WANs). A LAN is an interconnection of computer systems within a limited geographical area. A LAN may encompass a portion of a building, an entire building, or a cluster of buildings. A LAN allows users within the same office or company to exchange data files or share resources such as printers. A WAN connects computer systems over a large area, such as an entire city, state, or country. WANs are typically implemented using existing public switched telephone networks (PSTNs), and are thus operated and maintained by telephone service providers such as AT&T, MCI, and Sprint. A WAN allows users at remote sites, such as retail outlets, branch offices, or even their own homes, to exchange information with other users at a central corporate office or data site. The Internet, a complex interconnection of WANs, allows users to access information provided by companies and other users located worldwide.

Several different types of computer systems exist today, each manipulating and storing data in a different way. The interconnection of such diverse computer systems presents a challenging task. Networking capability is provided by hardware and/or software which typically implements a standardized interface specifically designed for the exchange of information among heterogeneous computer systems. In an effort to allow different types of computer systems to communicate with one another, the international standards organization (ISO) developed an open systems interconnection (OSI) reference model. The OSI reference model defines various layers ranging from a lowermost physical layer (network cables and host adapter hardware) to an uppermost application layer (communication access software). Between the physical layer and application layer are various other layers used to implement standard procedures for transferring information between communication devices (i.e., communication protocols).

The OSI reference model provides for packet data transmission. In packet-switched networks, information is transferred between communication devices in small portions or "packets". The packets are transmitted sequentially over a transmission medium (e.g., coaxial cable, twisted-pair cable, or fiber-optic cable) interconnecting the communication devices. Packet switching provides a way for all of the communication devices to share the full data transmission capability of the transmission medium without interference or interminable waiting periods for access. As a result, packet-switched communication networks are common today. The OSI model includes a data link layer above the physical layer, and a network layer above the data link layer.

The data link layer and the network layer, in combination, define the basic protocol used in the communication network. The network layer divides a block of data to be transmitted into packets. The data link layer is responsible for establishing a link between a transmitting communication device and a receiving communication device, encapsulating the packet data into "frames" which also include error control and flow control signals, transmitting the frames upon the network transmission medium, and deactivating the link when the data transfer is complete. Error control allows for detection of transmission errors. Flow control allows for transmission of data at a rate at which the receiving communication device can handle the incoming data.

A network interface unit within a communication device performs the data link layer functions. In a transmit mode, the network interface unit of a transmitting communication device establishes a link with a network interface unit of a receiving communication device, encapsulates the network-layer packet data into frames, transmits the frames upon the network transmission medium, and deactivates the link when the data transfer is complete. In a receive mode, the network interface unit receives frames from the network transmission medium, checks the received frame data for error, and reassembles the packets from the frame data. All of the above actions are performed according to a selected communication protocol. Examples of common communication protocols currently being used in LANs and WANs include TCP/IP, Ethernet, Frame Relay, DDS, ATM, X.25 and Sonet.

A microcontroller is an integrated circuit which incorporates a microprocessor core along with one or more support circuits on the same monolithic semiconductor substrate (i.e., chip). The support circuits perform support functions such as communication functions and memory interface functions. Systems which employ microcontrollers are typically implemented using fewer separate semiconductor devices. Advantages of such systems include lower fabrication costs and higher reliabilities. Microcontrollers find applications in industrial and commercial products including control systems, computer terminals, hand-held communications devices (e.g., cellular telephones), photocopier machines, facsimile machines, and hard disk drives. Microcontrollers are also commonly used within network interface units.

Each communication protocol achieves data transmission in a different way, and network hardware and/or software designed to implement one communication protocol will typically not recognize data transmitted using another protocol. In addition, communication protocols are often modified to satisfy the communications needs and constraints of particular communication networks. Furthermore, new communication protocols are continuously being developed in an effort to increase data exchange rates and reliabilities. It would thus be desirable to have a communication protocol processor which may be quickly and easily configured to implement a particular communication protocol or variant thereof. Such a communication protocol processor could be advantageously incorporated within a microcontroller, and the microcontroller employed within a network interface unit.

SUMMARY OF THE INVENTION

The problems outlined above are in large part solved by a communication protocol processor including a transmit unit and a receive unit, each having multiple microprocessor cores connected in series. Each microprocessor core performs an operation upon a stream of communication data, conducted along a data path, according to instructions and associated data stored within a code memory unit. A change in the operation performed by a given microprocessor core is effectuated during operation of the communication protocol processor by transmitting new instructions and associated data to the microprocessor core along the same data path used to convey communication data. The new instructions and data modify the existing instructions and associated data stored within the code memory unit.

The transmit unit of the communication protocol processor receives packet data in parallel units (i.e., a fixed number of bits transferred simultaneously) and produces a framed serial data stream. A parallel-to-serial (P-S) converter within the transmit unit converts the parallel packet data to a serial data stream. Each microprocessor core of the transmit unit is assigned one or more tasks which must be accomplished in sequence in order to encapsulate the serial data stream into frames in accordance with a selected communication protocol. The receive unit receives a framed serial data stream and produces packet data in parallel units. Each microprocessor core of the receive unit is assigned one or more tasks which must be accomplished in sequence in order to extract packet data from the framed serial data stream in accordance with the selected communication protocol. A serial-to-parallel (S-P) converter within the receive unit converts the serial packet data to parallel units.

Each microprocessor core is configured to execute instructions and has a separate code memory unit and data memory unit. Each code memory unit stores instructions and associated data used by the corresponding microprocessor core. Each code memory unit has a basic operating code portion and a protocol processing code portion. The basic operating code portion contains instructions and data required to initialize the corresponding microprocessor core and to direct the corresponding microprocessor core to perform basic communication data input and output functions. The protocol processing code portion contains instructions and data to direct the corresponding microprocessor core to perform the one or more assigned protocol processing tasks.

The contents of the protocol processing code portion of each code memory unit may be modified during operation of the communication protocol processor, reflecting a change or modification of the selected communication protocol. Instructions and associated data may be transmitted to one or more of the microprocessor cores via code packets transmitted along the same data paths used to convey communication data. The code packets may be interspersed within a serial stream of communication data undergoing processing. Each code packet preferably contains instructions and associated data directed to one of the microprocessor cores.

Each microprocessor core includes circuitry to recognize a code packet. If a code packet contains a unique identifier (i.e., an address) assigned to the microprocessor core, the microprocessor core writes the instructions and data contained within the code packet into the protocol processing code portion of the corresponding code memory unit. The receiving microprocessor core does not forward the code packet to the next microprocessor core along the data path. If the code packet does not contain the address assigned to the microprocessor core, the microprocessor core simply forwards the code packet to the next microprocessor core along the data path.

The communication protocol processor may be embodied within a microcontroller, and the microcontroller employed within a network interface unit (NIU). In addition to the microcontroller, the NIU also preferably includes one or more memory devices and a medium attachment unit (MAU). The one or more memory devices are coupled to the microcontroller and store instructions and associated data used by an execution unit of the microcontroller. The one or more memory devices also store packet data to be transmitted by, or packet data produced by, the communication protocol processor. The MAU is coupled to the microcontroller and is adapted for coupling to a network transmission medium of a communication network. The MAU functions as an electrical and mechanical interface between the microcontroller and the network transmission medium. The MAU includes circuitry for transmitting serial data upon the network transmission medium and for receiving serial data from the network transmission medium.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
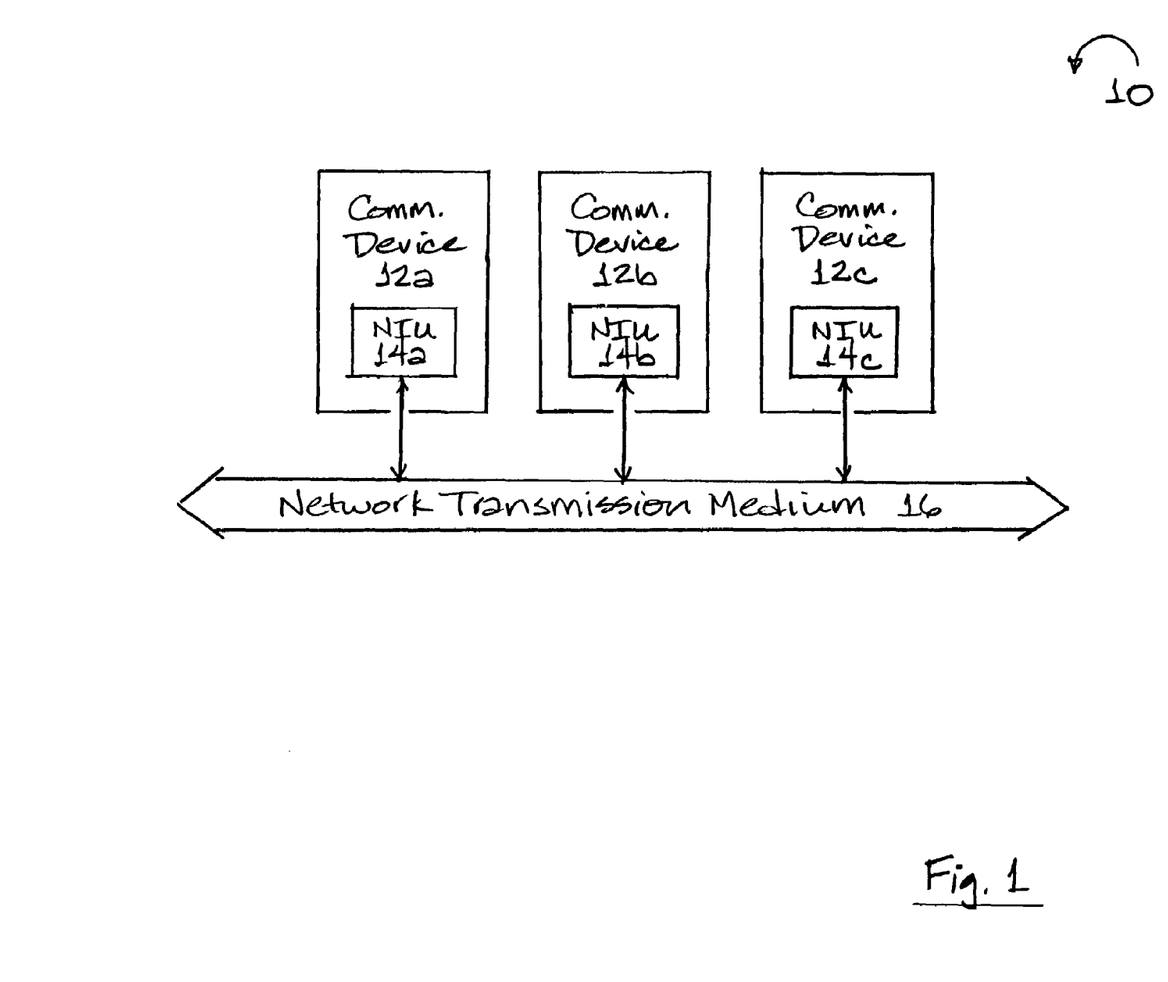
FIG. 1 is a block diagram of a communication network which incorporates the preferred embodiments of the present invention, wherein the communication network includes multiple communication devices coupled to a network transmission medium via respective network interface units (NIUs)

Referring now to FIG. 1, a communication network 10 which incorporates the preferred embodiments of the present invention is shown. Communication network 10 includes several communication devices 12a-c coupled to a network transmission medium 16 via respective network interface units (NIUs) 14a-c. Communication devices 12a-c exchange information (i.e., data) via NIUs 14a-c, respectively, and network transmission medium 16. Network transmission medium 16 may be, for example, a coaxial cable, a twisted-pair cable (e.g., a two-wire telephone line), a wireless link, or a fiber-optic cable. Communication device 12c may be, for example, an input/output (I/O) device such as a printer, a personal computer, an industrial controller, or a networking device such as a switch or router. The computer systems may exchange data and share the I/O device (i.e., the printer) via network transmission medium 16.

Figure 2:
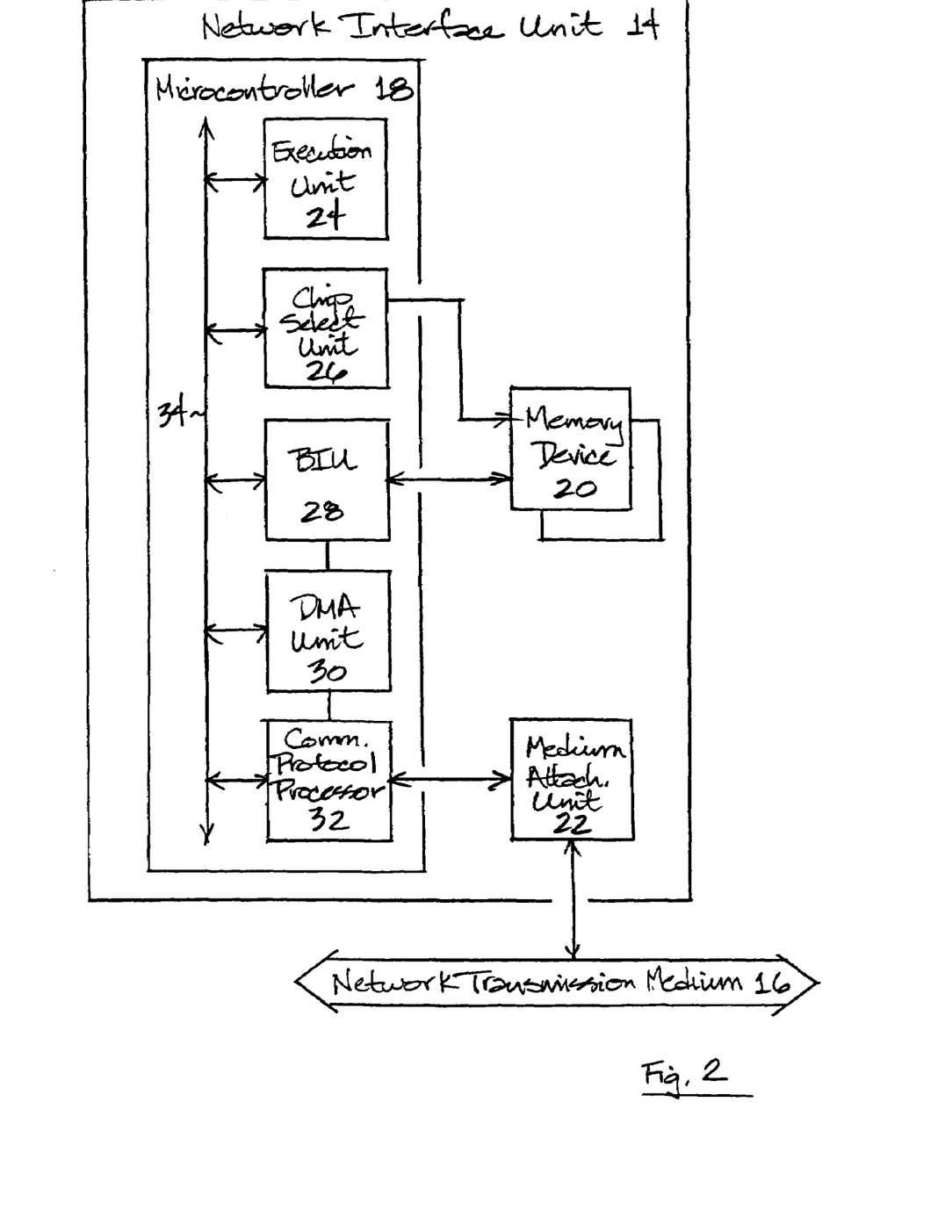
FIG. 2 is a block diagram of a preferred embodiment of each NIU of FIG. 1, wherein each NIU includes a microcontroller coupled to one or more memory devices and to a medium attachment unit (MAU), and wherein the microcontroller includes a communication protocol processor.

FIG. 2 is a block diagram of a preferred embodiment of each NIU 14 of FIG. 1. Each NIU 14 includes a microcontroller 18, one or more memory devices 20, and a medium attachment unit (MAU) 22. The one or more memory devices 20 are coupled to microcontroller 18 and configured to store data, including instructions and associated data used by microcontroller 18. The one or more memory devices 20 are preferably semiconductor memory devices such as, for example, static random access memory (SRAM) devices or dynamic random access memory (DRAM) devices.

Microcontroller 18 includes several components formed upon a single monolithic semiconductor substrate, among them an execution unit 24, a chip select unit 26, a bus interface unit (BIU) 28, a direct memory access (DMA) unit 30, a communication protocol processor 32, and an internal peripheral bus 34. Internal peripheral bus 34 includes multiple signal lines and is used to convey signals within microcontroller 18. Execution unit 24, chip select unit 26, BIU 28, DMA unit 30, and communication protocol processor 32 are coupled to and communicate via internal peripheral bus 34. Chip select unit 26 and BIU 28 are coupled to the one or more memory devices 20 and work together to store data within and to retrieve data from the one or more memory devices 20. Execution unit 24 is configured to execute instructions.

BIU 28 includes multiple data buffers used to transfer data between microcontroller 18 and the one or more memory devices 20. During instruction execution, execution unit 24 generates output signals which represent an offset portion of an address of a memory location from which data is to be read or to which data is to be written. Execution unit 24 drives the address offset portion upon internal peripheral bus 34. BIU 28 receives the address offset portion via internal peripheral bus 34 and combines the offset portion with a segment portion stored within BIU 28 to produce an address signal. BIU 28 drives the address signal upon internal peripheral bus 34. Chip select unit 26 receives the address signal via internal peripheral bus 34 and generates a chip select signal. The chip select signal is coupled to one or more memory devices 20 which include storage locations corresponding to the address signal. The chip select signal enables the one or more memory devices 20 for a data storage or retrieval operation.

Communication protocol processor 32 is coupled to MAU 22 and processes communication data in accordance with a selected communication protocol. Communication protocol processor 32 receives packet data to be transmitted upon network transmission medium 16 in parallel units via internal peripheral bus 34, converts the packet data to a serial data stream, encapsulates the serial data stream into frames in accordance with the selected communication protocol, and provides the resulting framed serial data stream to MAU 22 for transmission upon network transmission medium 16. Communication protocol processor 32 also receives a framed serial data stream from network transmission unit 16 via MAU 22, extracts the packet data from the framed serial data stream according to the selected communication protocol, converts the serial packet data to parallel units and stores the packet data within the one or more memory devices 20 via internal peripheral bus 34 and BIU 28 using a DMA technique.

DMA unit 30 is coupled between BIU 28 and communication protocol processor 32 and implements a DMA technique. The DMA technique allows data transfers between communication protocol processor 32 and the one or more memory devices 20 via internal peripheral bus 34 and BIU 28 without the involvement of execution unit 24. DMA unit 30 includes multiple control registers used to control the data transfer operation. When communication protocol processor 32 needs to transfer packet data to or from the one or more memory devices 20, communication protocol processor 32 initializes control registers within DMA unit 30 with transfer control information including the first address of the source of the block of data to be transferred (i.e., the source address), the first address of the destination of the block of data to be transferred (i.e., the destination address), and the number of bytes or words to be transferred (i.e., the byte/word count). Communication protocol processor 32 then issues a DMA request signal to DMA unit 30. DMA unit 30 responds by issuing a bus hold request signal to execution unit 24 indicating the need to use internal peripheral bus 34. Execution unit 24 responds to the asserted bus hold request signal by issuing a hold acknowledge signal and ceasing to drive signal lines of internal peripheral bus 34. DMA unit 30 responds to the asserted hold acknowledge signal by initiating the data transfer operation. DMA unit 30 generates address and control signals needed to read a byte or word of data from the source address and to write the data to the destination address. Data is transferred between communication protocol processor 32 and the one or more memory devices 20 via internal peripheral bus 34 and BIU 28. After each read/write operation, the source and destination addresses and the byte/word count are either incremented or decremented. This process is continued until the data transfer is complete. When the data transfer is complete, DMA unit 30 deasserts the hold request signal, allowing execution unit 24 to regain control over internal peripheral bus 34.

MAU 22 is coupled to microcontroller 18 and adapted for coupling to network transmission medium 16. MAU 22 provides an electrical and mechanical interface between NIU 14 and network transmission medium 16. MAU 22 is configured to receive signals from communication protocol processor 32 of microcontroller 18 and to drive the signals onto network transmission medium 16. MAU 22 is also configured to receive signals from network transmission medium 16 and to provide the signals to communication protocol processor 32 of microcontroller 18.

Figure 3:
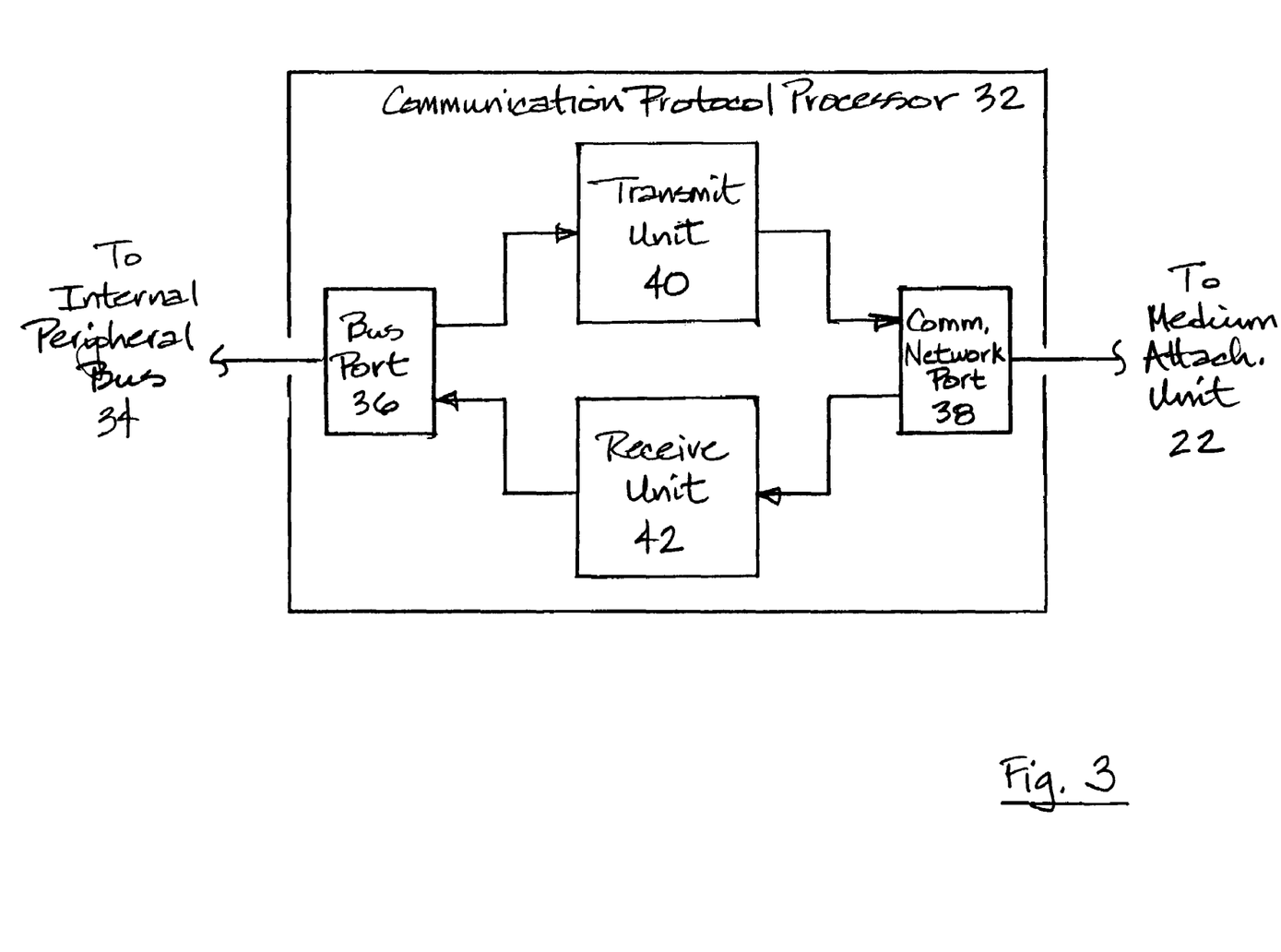
FIG. 3 is a block diagram of a preferred embodiment of the communication protocol processor of FIG. 2, wherein the communication protocol processor includes a transmit unit and a receive unit coupled between a bus port and a communication network port.

FIG. 3 is a block diagram of a preferred embodiment of communication protocol processor 32 of FIG. 2. Communication protocol processor 32 includes a bus port 36, a communication network port 38, a transmit unit 40, and a receive unit 42. Bus port 36 is adapted for coupling to internal peripheral bus 34 of microcontroller 18. Communication network port 38 is adapted for coupling to a network transmission medium 16 of communication network 10 via MAU 22. Transmit unit 40 is coupled between bus port 36 and communication network port 38. Transmit unit 40 receives packet data to be transmitted (i.e., transmit data) in parallel units from internal peripheral bus 34 via bus port 36, converts the transmit data to a serial transmit data stream, encapsulates the serial transmit data stream into frames in accordance with the selected communication protocol, and provides the resulting framed serial transmit data stream to MAU 22 via communication network port 38 for transmission upon network transmission medium 16. Receive unit 42 is also coupled between bus port 36 and communication network port 38. Receive unit 42 receives a framed serial receive data stream from network transmission medium 16 via MAU 22 and communication network port 38. Receive unit 42 extracts the packet data (i.e., receive data) from the framed serial receive data stream according to the selected communication protocol, converts the receive data to parallel units, and saves the receive data within the one or more memory devices 20 via bus port 36, internal peripheral bus 34, and BIU 28 using DMA as described above.

Figure 4:
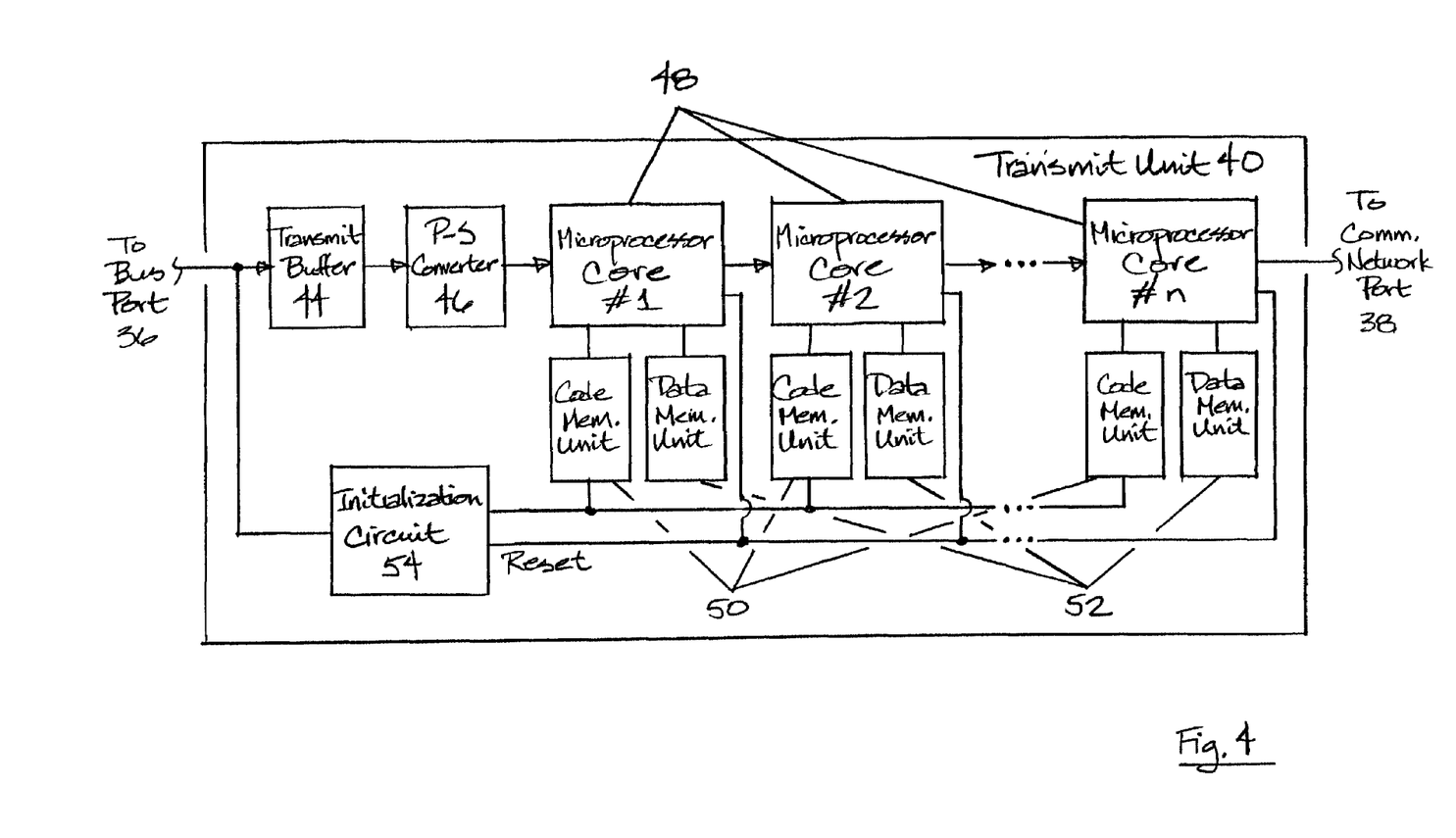
FIG. 4 is a block diagram of a preferred embodiment of the transmit unit of FIG. 3, wherein the transmit unit includes multiple microprocessor cores connected in series and configured to perform an operation upon a serial transmit data stream, and wherein each microprocessor core has its own code memory unit and data memory unit.

FIG. 4 is a block diagram of a preferred embodiment of transmit unit 40 of FIG. 3. Transmit unit 40 includes a transmit buffer 44, a parallel-to-serial (P-S) converter 46, multiple microprocessor cores 48, multiple code memory units 50, multiple data memory units 52, and an initialization circuit 54. The multiple microprocessor cores 48 are connected in series between bus port 36 and communication network port 38 along with transmit buffer 44 and P-S converter 46, and process communication data for transmission. Each microprocessor core 48 is configured to execute instructions. Each microprocessor core 48 is coupled to an associated code memory unit 50, which stores instructions and associated data used by the microprocessor core 48, and an associated data memory unit 52 which is used to temporarily store transmit data being processed by the microprocessor core 48. Initialization circuit 54 stores instructions and associated data within code memory units 50 during initialization of communication protocol processor 32. Initialization circuit 54 also initiates transmit data processing (i.e., instruction execution) by microprocessor cores 48. Transmit buffer 44 is used for temporary storage of transmit data received via internal peripheral bus 34 and bus port 36. Transmit buffer 44 is preferably a first-in-first-out (FIFO) buffer. P-S converter 46 is used to convert transmit data received in parallel units to a serial transmit data stream.

Initialization circuit 54 is coupled to internal peripheral bus 34, to each code memory unit 50, and to each microprocessor core 48. During initialization of communication protocol processor 32, initialization circuit 54 receives instructions and associated data to be loaded into code memory units 50 from execution unit 24 via internal peripheral bus 34. Initialization circuit 54 writes the instructions and associated data to code memory units 50, then issues a reset signal to each microprocessor core 48 which causes the microprocessor cores 48 to begin executing instructions within corresponding code memory units 50. This instruction execution causes the microprocessor cores 48 to perform transmit data processing.

Figure 5:
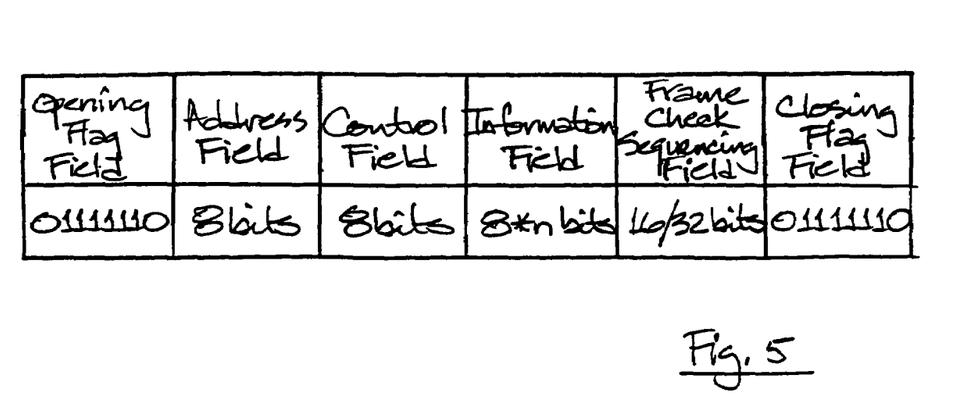
FIG. 5 illustrates the six fields of a frame of a high level data link control (HDLC) communication protocol.

Each microprocessor core 48 performs one or more tasks required to encapsulate the serial transmit data stream into frames in accordance with the selected communication protocol. Such encapsulation generally involves accomplishing multiple tasks in series. For example, the high level data link control (HDLC) communication protocol is one of the most common ISO data link layer protocols. HDLC is a bit-oriented protocol which calls for formatting of packet data and control information into frames and transmission of the frames over an established data link. The control information includes error control information and flow control information: FIG. 5 illustrates the six fields of an HDLC frame: the opening flag field, the address field, the control field, the information field, the frame check sequencing (FCS) field, and the closing flag field. All HDLC frames begin and end with a flag sequence '01111110' duplicated in the opening and closing flag fields. The flag sequence is used for frame synchronization. The address field allows identification of the transmitting communication device (i.e., transmitter) and the receiving communication device (i.e., receiver) involved in the transmission. The control field contains commands, responses, and sequence numbers used to maintain flow control between the transmitter and receiver. The information field contains the packet data to be transmitted from the transmitter to the receiver. The FCS field contains a cyclic redundancy check (CRC) value calculated by the transmitter, allowing for error control. Upon receiving the frame, the receiver performs the same CRC calculation. If the CRC value calculated by the receiver does not match the value transmitted by the transmitter, the receiver indicates a transmission error by returning a frame having a command field containing a frame reject (FRMR) response. See, International Standard ISO/IEC 3329, "Information Technology—Telecommunications and Information Exchange Between Systems—High-Level Data Link Control (HDLC) Procedures—Frame Structure," 1993, ISO/IEC, available through the American National Standards Institute, NY.

Four microprocessor cores 48 may be used to implement the transmit function. Each microprocessor core 48 is assigned a specific task. A first microprocessor core 48 (i.e., and "upstream" microprocessor core 48) is coupled directly to P-S converter 46. The first microprocessor 48 performs a CRC generation function. A second microprocessor core 48, coupled directly to the first microprocessor core 48, performs a zero-bit insertion function. A third microprocessor core 48, coupled directly to the second microprocessor core 48, performs a flag and abort frame processing function. A fourth microprocessor core 48 (i.e., a "downstream" microprocessor core 48) is coupled between the third microprocessor core 48 and communication network port 38. The fourth microprocessor core 48 performs an output function. The first microprocessor core 48 receives a serial transmit data stream produced by P-S converter 46. The transmit serial data stream includes the contents of the address field, control field, and information field of a frame to be transmitted. The first microprocessor core 48 generates a CRC value based upon the data in the serial transmit data stream and appends the CRC value (i.e., the FCS field contents) to the end of the serial transmit data stream. The second microprocessor core 48 examines the serial transmit data stream produced by the first microprocessor core 48 and inserts a '0' bit after all sequences of five continuous '1' bits in order to preclude the occurrence of the flag sequence '01111110' within the frame. The third microprocessor core 48 appends the flag sequence '01111110' to the beginning and to the end of the serial transmit data stream produced by the third microprocessor core 48, forming a complete frame, and provides the serial transmit data stream to the fourth microprocessor core 48. Between frames, the third microprocessor core 48 forwards either the flag sequence, a continuous '1' bit, or a continuous '0' bit to the fourth microprocessor core 48. In response to an abort control signal, the third microprocessor core 48 also forwards an abort sequence to the fourth microprocessor core 48. The abort sequence is a '0' bit followed by seven or fifteen consecutive '1' bits. The fourth microprocessor core 48 forwards the framed serial transmit data stream to MAU 22 via communication network port 38 for transmission upon network transmission medium.

Figure 6:
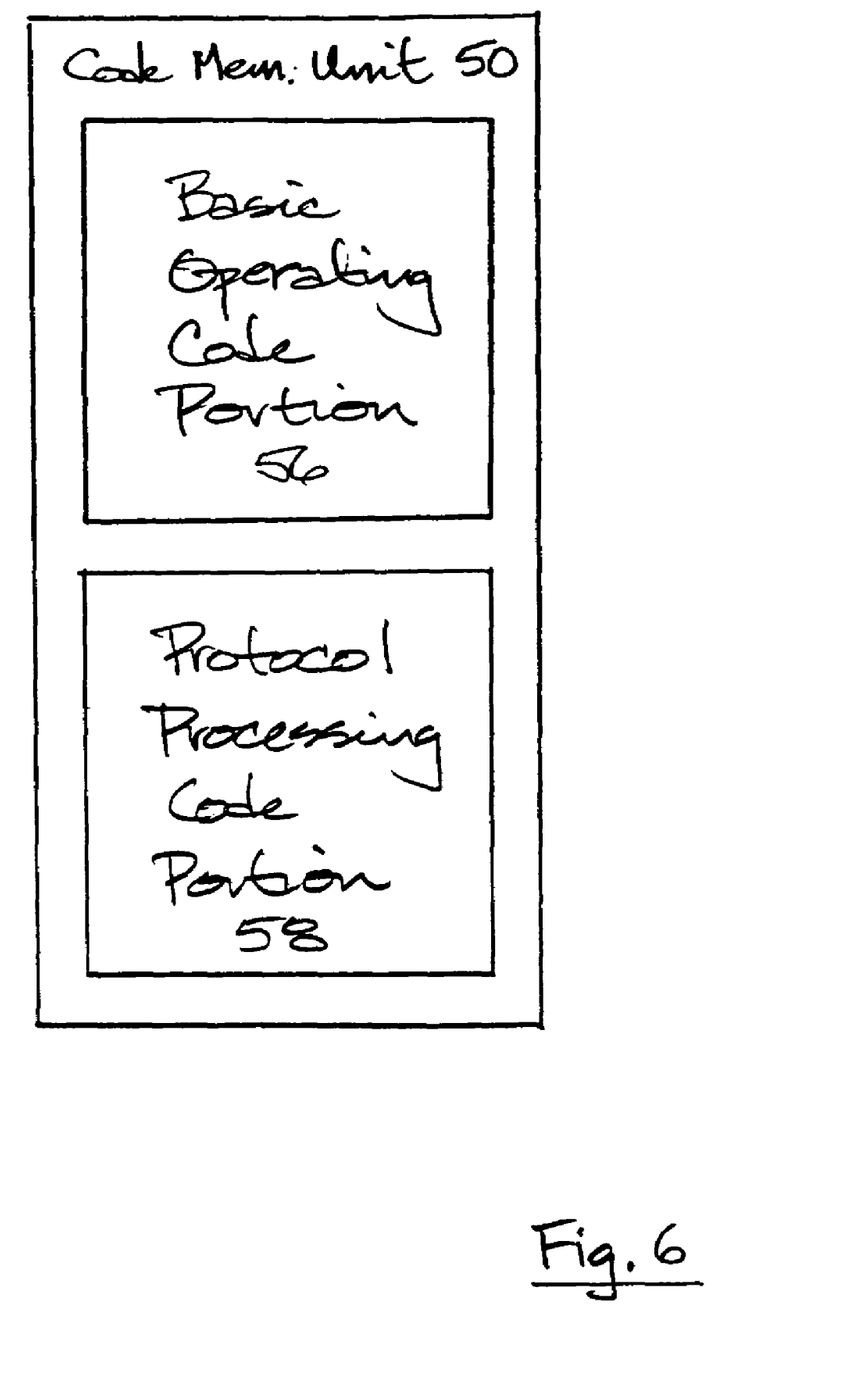
FIG. 6 is a block diagram of a preferred embodiment of each code memory unit of FIG. 4, wherein each code memory unit includes a basic operating code portion and a protocol processing code portion.

FIG. 6 is a block diagram of a preferred embodiment of each code memory unit 50 in FIG. 4. Each code memory unit 50 includes a basic operating code portion 56 and a protocol processing code portion 58. Basic operating code portion 56 contains instructions and data required to initialize the corresponding microprocessor core 48 and to direct the corresponding microprocessor core 48 to perform basic communication data input and output functions. Basic operating code portion 56 may be contained within one or more non-volatile semiconductor memory devices such as, for example, mask-programmed read only memory (ROM) or programmable read only memory (PROM). Basic operating code portion 56 may be also be contained within one or more volatile semiconductor memory devices such as, for example, DRAM or SRAM memory devices. In this case, initialization circuit 54 is responsible for writing instructions and associated data into basic operating code portion 56 prior to initiating operation of communication protocol processor 32.

Protocol processing code portion 58 contains instructions and data to direct the corresponding microprocessor core 48 to perform the one or more protocol processing tasks assigned to the corresponding microprocessor core 48. The contents of protocol processing code portion 58 are written into protocol processing code portion 58 by initialization circuit 54 prior to initiation of the operation of communication protocol processor 32. Protocol processing code portion 58 is preferably contained within one or more volatile semiconductor memory devices such as, for example, DRAM or SRAM memory devices.

The contents of protocol processing code portion 58 of each code memory unit 50 may be modified during operation of communication protocol processor 32, reflecting a change or modification of the selected communication protocol. Instructions and associated data may be transmitted to one or more of the microprocessor cores 48 via code packets transmitted along the same transmit serial data path used to convey transmit data. The code packets may be interspersed within a transmit serial data stream undergoing processing. Each code packet preferably contains instructions and associated data directed to one of the microprocessor cores 48. Code packets may be generated by execution unit 24 and conveyed to communication protocol processor 32 via internal peripheral bus 34. Alternately, the upstream microprocessor core 48 directly coupled to P-S converter 46 may generate code packets to be transmitted to the remaining microprocessor cores 48.

Figure 7:
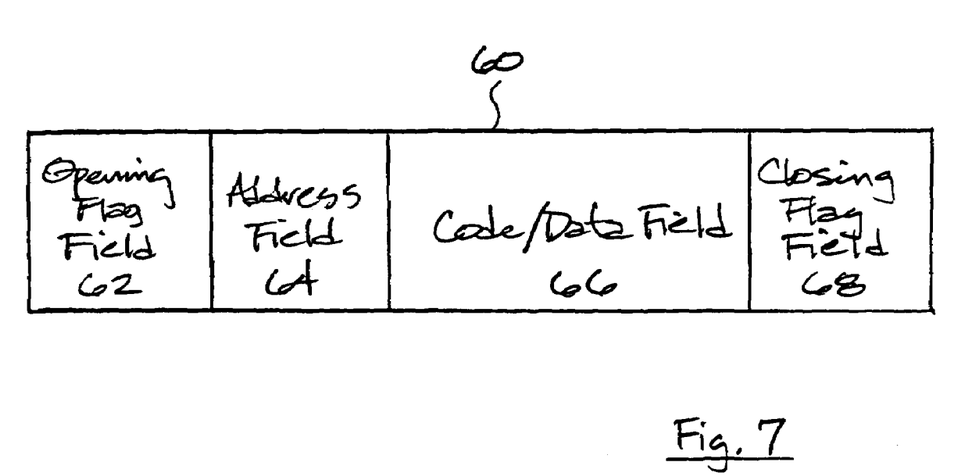
FIG. 7 is a block diagram of a preferred embodiment of a code packet used to modify the instructions and associated data stored within the protocol processing code portion of a code memory unit during operation of the communication protocol processor.

FIG. 7 is a block diagram of a preferred embodiment of a code packet 60 used to convey instructions and associated data to a microprocessor core 48. Code packet 60 includes an opening flag field 62, an address field 64, a code/data field 66, and a closing flag field 68. Opening flag field 62 signals the beginning of a code packet. Address field 64 follows the opening flag field and identifies the microprocessor core 48 selected to receive the instructions and associated data. Code/data field 66 includes the instructions and associated data being transferred, preferably in the form of memory address/memory content pairs. The memory content portion includes a machine code instruction or associated data. The memory address portion identifies the address of the memory location within the protocol processing code portion 58 of the code memory unit 50 coupled to the identified microprocessor core 48 where the memory content portion is to be stored. Closing flag field 68 signals the ending of a code packet.

Each microprocessor core 48 includes circuitry to recognize the occurrence of opening flag field 62 of a code packet 60 conveyed along the transmit serial data path. When a microprocessor core 48 recognizes an opening flag field 62, the microprocessor core 48 compares the contents of address field 64 to a unique identifier assigned to the microprocessor core 48 during initialization of communication protocol processor 32. If a match occurs, the microprocessor core 48 writes the instructions and data contained within code/data field 66 into the protocol processing code portion 58 of the code memory unit 50 coupled to the microprocessor core 48. The receiving microprocessor core 48 does not forward code packet 60 to the next microprocessor core 48 along the transmit serial data path. If the contents of address field 64 do not match the unique identifier assigned to the microprocessor core 48, the microprocessor core 48 simply forwards code packet 60 to the next microprocessor core 48 along the transmit serial data path.

Figure 8:
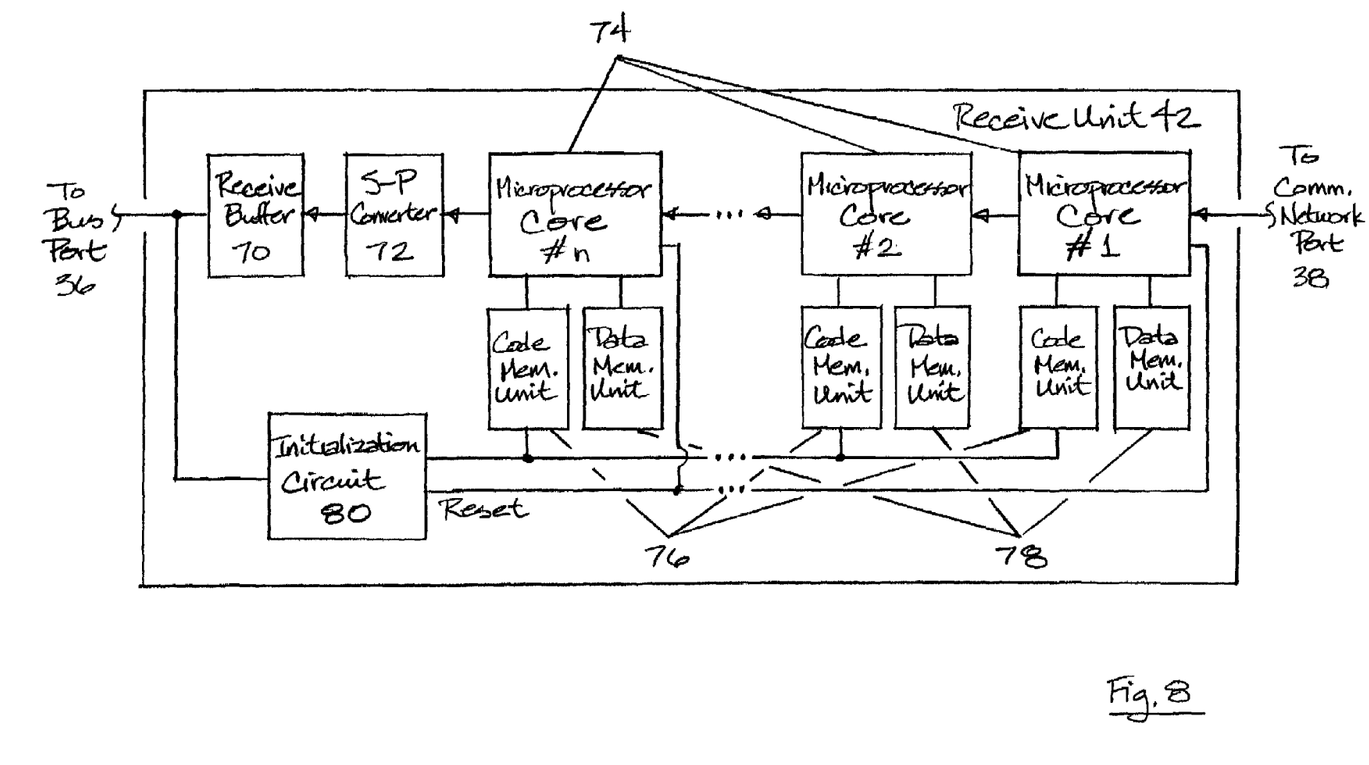
FIG. 8 is a block diagram of a preferred embodiment of the receive unit of FIG. 3, wherein the receive unit includes multiple microprocessor cores connected in series and configured to perform an operation upon a serial receive data stream, and wherein each microprocessor core has its own code memory unit and data memory unit.

FIG. 8 is a block diagram of a preferred embodiment of receive unit 42 of FIG. 3. Receive unit 42 includes a receive buffer 70, a serial-to-parallel (S-P) converter 72, multiple microprocessor cores 74, multiple code memory units 76, multiple data memory units 78, and an initialization circuit 80. The multiple microprocessor cores 74 are connected in series between bus port 36 and communication network port 38 along with receive buffer 70 and S-P converter 72, and process receive data received from network transmission medium 16. Each microprocessor core 74 is configured to execute instructions. Each microprocessor core 74 is coupled to a corresponding code memory unit 76, which stores instructions and associated data used by the microprocessor core 74, and a corresponding data memory unit 78 which is used to temporarily store receive data being processed by the microprocessor core 74. Initialization circuit 80 stores instructions and associated data within code memory units 76 during initialization of communication protocol processor 32. Initialization unit 80 also initiates receive data processing (i.e., instruction execution) by microprocessor cores 74. Initialization circuit 80 operates just like initialization circuit 54 of transmit unit 40 described above. S-P converter 72 is used to convert serial receive data produced by microprocessor cores 74 to parallel units. Receive buffer 70 is used for temporary storage of the receive data in parallel units. Receive buffer 70 is preferably a first-in-first-out (FIFO) buffer.

Each microprocessor core 74 of receive unit 42 performs one or more tasks required to extract packet data from a framed serial receive data stream in accordance with the selected communication protocol. Such extraction generally involves accomplishing multiple tasks in series. As with the transmit function, each microprocessor core 74 performs an assigned operation upon receive data within the receive serial data path, and provides the processed serial receive data stream to the next microprocessor core 74 in the receive serial data path.

Figure 9:
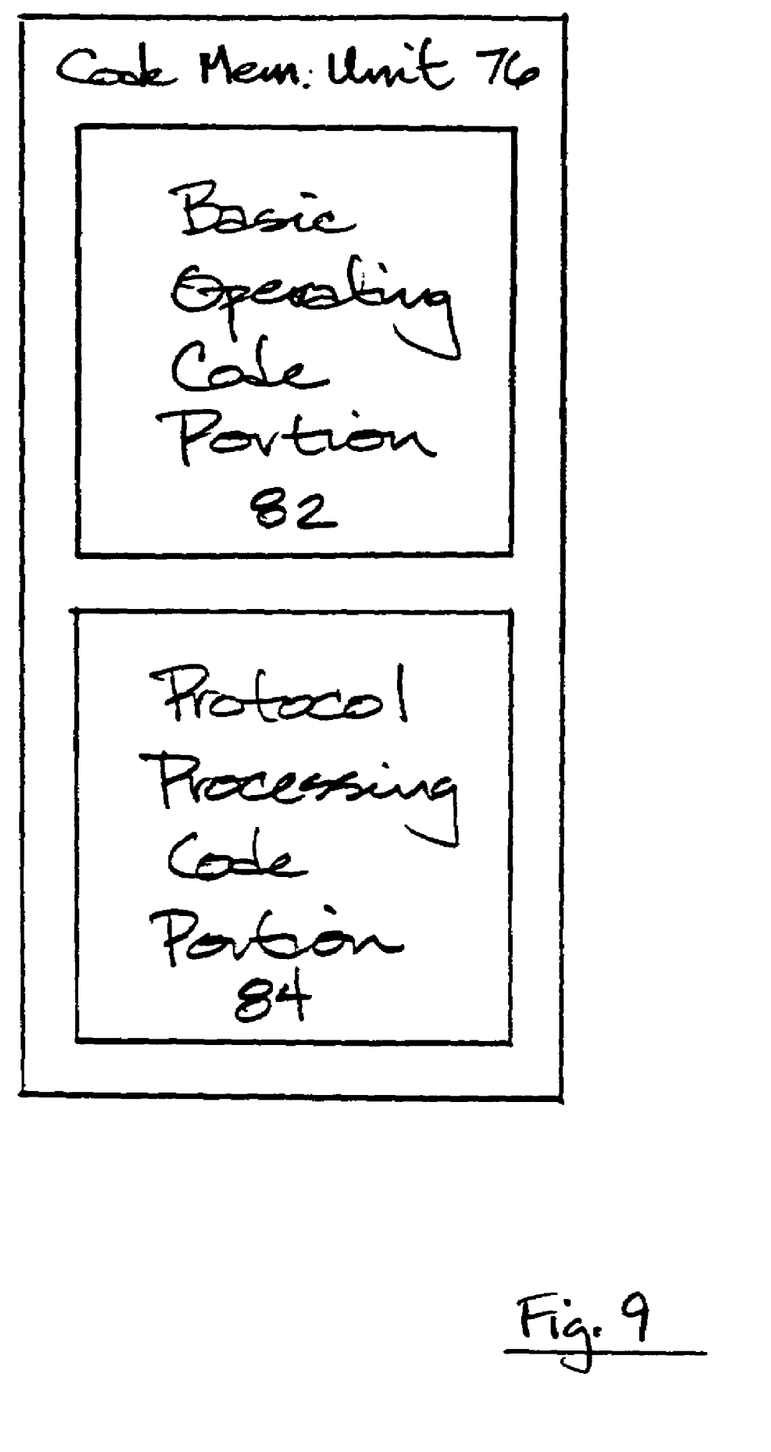
FIG. 9 is a block diagram of a preferred embodiment of each code memory unit of FIG. 8, wherein each code memory unit includes a basic operating code portion and a protocol processing code portion.

FIG. 9 is a block diagram of a preferred embodiment of each code memory unit 76 in FIG. 8. Each code memory unit 76 includes a basic operating code portion 82 and a protocol processing code portion 84. Basic operating code portion 82 contains instructions and data required to initialize the corresponding microprocessor core 74 and to direct the corresponding microprocessor core 74 to perform basic communication data input and output functions. Basic operating code portion 82 may be contained within one or more non-volatile semiconductor memory devices such as, for example, mask-programmed read only memory (ROM) or programmable read only memory (PROM). Basic operating code portion 82 may be also be contained within one or more volatile semiconductor memory devices such as, for example, DRAM or SRAM memory devices. In this case, initialization circuit 80 is responsible for writing instructions and associated data into basic operating code portion 82 prior to initiating operation of communication protocol processor 32.

Protocol processing code portion 84 contains instructions and data to direct the corresponding microprocessor core 74 to perform the one or more protocol processing tasks assigned to the corresponding microprocessor core 74. The contents of protocol processing code portion 84 are written into protocol processing code portion 84 by initialization circuit 80 prior to initiation of the operation of communication protocol processor 32. Protocol processing code portion 84 is preferably contained within one or more volatile semiconductor memory devices such as, for example, DRAM or SRAM memory devices.

As with protocol processing code portions 58 of code memory units 50 of transmit unit 40, the contents of protocol processing code portions 84 of code memory units 76 of receive unit 42 may be modified during operation of communication protocol processor 32, reflecting a change or modification of the selected communication protocol. Instructions and associated data may be transmitted to one or more of the microprocessor cores 74 via code packets 60 (FIG. 7). Code packets 60 may be generated by execution unit 24 and conveyed to transmit unit 40 of communication protocol processor 32 via internal peripheral bus 34, then transmitted to receive unit 42 via a loopback transmission mode. Alternately, the microprocessor core 74 directly coupled to communication network port 38 (i.e., the "upstream" microprocessor core 74) may generate code packets to be transmitted to the remaining microprocessor cores 74. Each microprocessor core 74 includes circuitry to recognize the occurrence of opening flag field 62 of a code packet 60 conveyed along the receive serial data path.

When a code packet 60 directed to a microprocessor core 74 of receive unit 42 is conveyed using the loopback transmission mode, microprocessor cores 48 of transmit unit 40 simply forward the code packet 60 along the transmit serial data path. MAU 22 transmits code packet 60 upon network transmission medium 16. The code packet 60 is later received by MAU 22 from network transmission medium 16 and provided to receive unit 42 of communication protocol processor 32.

When a microprocessor core 74 of receive unit 42 recognizes an opening flag field 62, the microprocessor core 74 compares the contents of address field 64 to a unique identifier assigned to the microprocessor core 74 during initialization of communication protocol processor 32. If a match occurs, the microprocessor core 74 writes the instructions and data contained within code/data field 66 into the protocol processing code portion 84 of the code memory unit 76 coupled to the microprocessor core 74. The receiving microprocessor core 74 does not forward code packet 60 to the next microprocessor core 74 along the receive serial data path. If the contents of address field 64 do not match the unique identifier assigned to the microprocessor core 74, the microprocessor core 74 simply forwards code packet 60 to the next microprocessor core 74 along the receive serial data path.

It will be appreciated by those skilled in the art having the benefit of this disclosure that this invention is believed to be capable of achieving a communication protocol processor including a transmit unit and a receive unit, each having multiple microprocessor cores connected in series. Each microprocessor core performs an operation upon a stream of communication data, conducted along a serial data path, according to instructions and associated data stored within a code memory unit. A change in the operation performed by a given microprocessor core is effectuated during operation of the communication protocol processor by transmitting new instructions and associated data directed to the microprocessor core along the same serial data path used to convey communication data. The new instructions and data modify the existing instructions and associated data stored within the code memory unit. The communication protocol processor may be embodied within a microcontroller, and the microcontroller employed within a network interface unit (NIU). Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A communication protocol processor, comprising:
   an interface port; and
   a first plurality of microprocessor cores connected in series to receive a serial data stream from said interface port and to perform a protocol processing operation upon said serial data stream;
   wherein a first one of said first plurality of microprocessor cores is configured to determine whether a code packet is embedded in said serial data stream and whether said code packet designates said first one of said first plurality of processor cores, to perform a first part of said protocol processing operation upon said serial data stream, and to transmit a resultant serial data stream of said first part to a second one of said first plurality of microprocessor cores;
   wherein said second one of said first plurality of microprocessor cores is configured to perform a second part of said protocol processing operation upon said resultant serial data stream; and
   wherein in response to said first one of said first plurality of microprocessor cores determining that said code packet is embedded in said serial data stream and designates said first one of said first plurality of microprocessor cores, said first part of said protocol processing operation is configured dependent upon said code packet without said first one of said first plurality of microprocessor cores forwarding said code packet to a subsequent one of said first plurality of microprocessor cores.

2. The communication protocol processor as recited in claim 1, further comprising a respective code memory unit coupled to each of said first plurality of microprocessor cores, wherein each said respective code memory unit is configured to store a plurality of instructions forwarded within said serial transmit data stream, and wherein each said respective code memory unit is further configured to provide said plurality of instructions to its respective microprocessor core.

3. The communication protocol processor as recited in claim 2, wherein each said respective code memory unit is configured to store a unique set of instructions for configuring each said microprocessor core to perform a different part of said protocol processing operation upon said serial data stream.

4. The communication protocol processor as recited in claim 3, wherein each said respective code memory unit corresponding to one of said first plurality of microprocessor cores is configured by storing a code packet designating said corresponding one of said first plurality of microprocessor cores received during performance of the protocol processing operation upon said serial data stream.

5. The communication protocol processor as recited in claim 1, wherein said interface port is a communication network port, said serial data stream is a serial receive data stream, said resultant serial data stream is a resultant serial receive data stream, and said protocol processing operation is a receive protocol processing operation, said communication protocol processor further comprising:
 a bus interface port; and
 a second plurality of microprocessor cores connected in series to receive a serial transmit data stream from said bus interface port and to perform a transmit protocol processing operation upon said serial transmit data stream, wherein a first one of said second plurality of microprocessor cores is configured to perform a first part of said transmit protocol processing operation upon said serial transmit data stream and to transmit a resultant serial transmit data stream of said first part directly to a second one of said second plurality of microprocessor cores configured to perform a second part of said transmit protocol processing operation upon said resultant serial transmit data stream.

6. The communication protocol processor as recited in claim 1, wherein said interface port is a bus interface port, said serial data stream is a serial transmit data stream, said resultant serial data stream is a resultant serial transmit data stream, and said protocol processing operation is a transmit protocol processing operation, said communication protocol processor further comprising:
 a communication network port; and
 a second plurality of microprocessor cores connected in series to receive a serial receive data stream from said communication network port and to perform a receive protocol processing operation upon said serial receive data stream, wherein a first one of said second plurality of microprocessor cores is configured to perform a first part of said receive protocol processing operation upon said serial receive data stream and to transmit a resultant serial receive data stream of said first part directly to a second one of said second plurality of microprocessor cores configured to perform a second part of said receive protocol processing operation upon said resultant serial receive data stream.

7. The communication protocol processor as recited in claim 6, wherein said first plurality of microprocessor cores are configured to work together to encapsulate the serial transmit data stream into frames in accordance with a selected communication protocol.

8. The communication protocol processor as recited in claim 6, wherein said second plurality of microprocessor cores are configured to work together to extract communication data from the serial receive data stream in accordance with a selected communication protocol.

9. The communication protocol processor as recited in claim 6, wherein said first and second pluralities of microprocessor cores are coupled in parallel between said bus interface port and said communication network port, and wherein said bus port is adapted for coupling to a bus and said communication network port is adapted for coupling to a transmission medium over which communication data is sent across a communication network.

10. The communication protocol processor as recited in claim 9, wherein said first plurality of microprocessor cores includes an upstream transmit microprocessor core and a downstream transmit microprocessor core, and wherein the remainder of said first plurality of microprocessor cores are connected in series between said upstream transmit microprocessor core and said downstream transmit microprocessor core, and wherein said upstream transmit microprocessor core is coupled to receive said serial transmit data stream, and wherein said downstream transmit microprocessor core is coupled to said communication network port, and wherein said downstream transmit microprocessor core produces a framed serial transmit data stream in accordance with a selected communication protocol and provides said framed serial transmit data stream to said communication network port.

11. The communication protocol processor as recited in claim 9, wherein said second plurality of microprocessor cores includes an upstream receive microprocessor core and a downstream receive microprocessor core, wherein the remainder of said second plurality of microprocessor cores are connected in series between said upstream receive microprocessor core and said downstream receive microprocessor core, and wherein said upstream receive microprocessor core is coupled to receive said serial receive data stream from said communication network port, and wherein said downstream receive microprocessor core produces a serial stream of communication data in accordance with a selected communication protocol.

12. A communication protocol processor, comprising:
 an interface port; and
 a first plurality of microprocessor cores coupled to receive a serial data stream from said interface port and to perform a protocol processing operation upon said serial data stream, wherein at least one of said first plurality of microprocessor cores is configured by code packets embedded within said serial data stream to perform at least part of said protocol processing operation.

13. The communication protocol processor as recited in claim 12, further comprising a respective code memory unit coupled to each of the microprocessor cores configured by said code packets, wherein each said respective code memory unit is configured to store a plurality of instructions from said code packets, and wherein each said respective code memory unit is further configured to provide said plurality of instructions to its respective microprocessor core.

14. The communication protocol processor as recited in claim 13, wherein each said respective code memory unit is configured to store a unique set of instructions for configuring each said respective microprocessor core to perform a different part of said protocol processing operation upon said serial data stream.

15. The communication protocol processor as recited in claim 13, wherein each said respective code memory unit is configured by storing a code packet received during performance of the protocol processing operation upon said serial data stream.

16. The communication protocol processor as recited in claim 12, wherein said interface port is a communication network port, said serial data stream is a serial receive data stream, and said protocol processing operation is a receive protocol processing operation, said communication protocol processor further comprising:
- a bus interface port; and
- a second plurality of microprocessor cores coupled to receive a serial transmit data stream from said bus interface port and to perform a transmit protocol processing operation upon said serial transmit data stream, wherein at least one of said second plurality of microprocessor cores is configured by code packets embedded within said serial transmit data stream to perform at least part of said transmit protocol processing operation.

17. The communication protocol processor as recited in claim 12, wherein said interface port is a bus interface port, said serial data stream is a serial transmit data stream, and said protocol processing operation is a transmit protocol processing operation, said communication protocol processor further comprising:
- a communication network port; and
- a second plurality of microprocessor cores coupled to receive a serial receive data stream from said communication network port and to perform a receive protocol processing operation upon said serial receive data stream, wherein at least one of said second plurality of microprocessor cores is configured by code packets embedded within said serial receive data stream to perform at least part of said receive protocol processing operation.

18. The communication protocol processor as recited in claim 17, wherein said first plurality of microprocessor cores are configured to work together to encapsulate the serial transmit data stream into frames in accordance with a selected communication protocol.

19. The communication protocol processor as recited in claim 17, wherein said second plurality of microprocessor cores are configured to work together to extract communication data from the serial receive data stream in accordance with a selected communication protocol.

20. The communication protocol processor as recited in claim 17, wherein said first and second pluralities of microprocessor cores are coupled in parallel between said bus interface port and said communication network port, and wherein said bus port is adapted for coupling to a bus and said communication network port is adapted for coupling to a transmission medium over which communication data is sent across a communication network.

21. The communication protocol processor as recited in claim 20, wherein said first plurality of microprocessor cores includes an upstream transmit microprocessor core and a downstream transmit microprocessor core, and wherein the remainder of said first plurality of microprocessor cores are connected in series between said upstream transmit microprocessor core and said downstream transmit microprocessor core, and wherein said upstream transmit microprocessor core is coupled to receive said serial transmit data stream, and wherein said downstream transmit microprocessor core is coupled to said communication network port, and wherein said downstream transmit microprocessor core produces a framed serial transmit data stream in accordance with a selected communication protocol and provides said framed serial transmit data stream to said communication network port.

22. The communication protocol processor as recited in claim 20, wherein said second plurality of microprocessor cores includes an upstream receive microprocessor core and a downstream receive microprocessor core, wherein the remainder of said second plurality of microprocessor cores are connected in series between said upstream receive microprocessor core and said downstream receive microprocessor core, and wherein said upstream receive microprocessor core is coupled to receive said serial receive data stream from said communication network port, and wherein said downstream receive microprocessor core produces a serial stream of communication data in accordance with a selected communication protocol.

23. A network interface unit, comprising:
- a memory device for storing instructions and transmit data;
- a communication protocol processor coupled to said memory device, comprising a first plurality of microprocessor cores coupled to receive a serial transmit data stream and to perform a transmit protocol processing operation upon said serial transmit data stream, wherein at least one of said first plurality of microprocessor cores is configured by code packets embedded within said serial transmit data stream to perform at least part of said transmit protocol processing operation; and
- a medium attachment unit adapted for coupling to a network transmission medium of a communication network during use, wherein the medium attachment unit is coupled to said communication protocol processor, and wherein the medium attachment unit is configured to receive the framed serial transmit data stream from said communication protocol processor and to transmit the framed serial transmit data stream upon said network transmission medium.

24. The network interface unit as recited in claim 23, wherein said communication protocol processor further comprises a second plurality of microprocessor cores coupled to receive a serial receive data stream and to perform a receive protocol processing operation upon said serial receive data stream, wherein at least one of said second plurality of microprocessor cores is configured by code packets embedded within said serial receive data stream to perform at least part of said receive protocol processing operation, and wherein said medium attachment unit is further configured to receive the serial receive data stream from the network transmission medium and to provide the serial receive data stream to the communication protocol processor.

25. The network interface unit as recited in claim 24, wherein said second plurality of microprocessor cores produce said serial stream of receive data in accordance with a selected communication protocol.

26. The network interface unit as recited in claim 23, wherein said first plurality of microprocessor cores produce said framed transmit serial data stream in accordance with a selected communication protocol.

27. The network interface unit as recited in claim 23, wherein said communication protocol processor further comprises a respective code memory unit coupled to each of the microprocessor cores configured by said code packets, wherein each said respective code memory unit is configured to store a plurality of instructions from said code packets, wherein each said respective code memory unit is further configured to provide said plurality of instructions to its respective microprocessor core, wherein each said respective code memory unit is configured to store a unique set of instructions for configuring each said respective microprocessor core to perform a different part of said transmit protocol processing operation upon said serial transmit data stream, and wherein each said respective code memory unit is configured by storing a code packet received during performance of the transmit protocol processing upon said serial transmit data stream.

28. A method, comprising:
receiving a serial data stream from an interface port;
performing a protocol processing operation on said serial data stream; and
configuring at least part of said protocol processing operation by embedding code packets within said serial data stream.

29. The method as recited in claim 28, further comprising storing a first plurality of instructions from said code packets in a respective code memory unit coupled to each of a first plurality of microprocessor cores, wherein each said respective code memory unit is configured to store a first unique set of instructions for configuring each said respective microprocessor core to perform a different part of said protocol processing operation upon said serial data stream.

30. The method as recited in claim 29, wherein said code packets are received during said performing a protocol processing operation upon said serial data stream.

31. The method as recited in claim 29, wherein said interface port is a bus interface port, said serial data stream is a serial transmit data stream, said protocol processing operation is a transmit protocol processing operation, and said code packets are transmit code packets, said method further comprising:
receiving a serial receive data stream from an communication network port;
performing a receive protocol processing operation on said serial receive data stream;
configuring at least part of said receive protocol processing operation by embedding receive code packets within said serial receive data stream; and
storing a second plurality of instructions from said receive code packets in a respective code memory unit coupled to each of a second plurality of microprocessor cores, wherein each said respective code memory unit is configured to store a second unique set of instructions for configuring each said respective microprocessor core to perform a different part of said receive protocol processing operation upon said serial receive data stream.

32. A method, comprising:
receiving a serial data stream from an interface port;
performing a first part of a protocol processing operation on said serial data stream in a first one of a first plurality of microprocessor cores;
determining whether a code packet is embedded in said serial data stream and whether said code packet designates a first one of said first plurality of processor cores;
in response to determining that said code packet is embedded in said serial data stream and designates said first one of said first plurality of microprocessor cores, configuring said first part of said protocol processing operation dependent upon said code packet without forwarding said code packet to a subsequent one of said first plurality of microprocessor cores;
transmitting a resultant serial data stream of said first part of said protocol processing operation to a second one of said first plurality of microprocessor cores; and
performing a second part of said protocol processing operation on said resultant serial data stream using said result in said second one of said first plurality of microprocessor cores.

33. The method as recited in claim 32, further comprising storing a first plurality of instructions forwarded within said serial data stream in a respective code memory unit coupled to each of said first plurality of microprocessor cores, wherein each said respective code memory unit is configured to store a first unique set of instructions for configuring each said respective microprocessor core to perform a different part of said protocol processing operation upon said serial data stream.

34. The method as recited in claim 33, further comprising configuring each said respective microprocessor core to perform a different part of said protocol processing operation by storing a code packet designating said respective microprocessor core received during performance of said protocol processing operation upon said serial data stream.

35. The method as recited in claim 33, wherein said interface port is a bus interface port, said serial data stream is a serial transmit data stream, said resultant serial data stream is a resultant serial transmit data stream, and said protocol processing operation is a transmit protocol processing operation, said method further comprising:
receiving a serial receive data stream from an communication network port;
performing a first part of a receive protocol processing operation on said serial receive data stream in a first one of a second plurality of microprocessor cores;
transmitting a resultant serial receive data stream of said first part of said receive protocol processing operation directly to a second one of said second plurality of microprocessor cores;
performing a second part of said receive protocol processing operation on said resultant serial receive data stream using said result in said second one of said second plurality of microprocessor cores; and
storing a first plurality of instructions forwarded within said serial receive data stream in a respective code memory unit coupled to each of said second plurality of microprocessor cores, wherein each said respective code memory unit is configured to store a second unique set of instructions for configuring each said respective microprocessor core to perform a different part of said receive protocol processing operation upon said serial receive data stream.

* * * * *